(12) United States Patent
Akihisa

(10) Patent No.: US 8,938,959 B2
(45) Date of Patent: Jan. 27, 2015

(54) SPARK IGNITION-TYPE INTERNAL COMBUSTION ENGINE

(75) Inventor: Daisuke Akihisa, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 257 days.

(21) Appl. No.: 13/502,676

(22) PCT Filed: Jun. 10, 2011

(86) PCT No.: PCT/JP2011/063866
§ 371 (c)(1),
(2), (4) Date: Apr. 18, 2012

(87) PCT Pub. No.: WO2012/169079
PCT Pub. Date: Dec. 13, 2012

(65) Prior Publication Data
US 2012/0312014 A1    Dec. 13, 2012

(51) Int. Cl.
| | | |
|---|---|---|
| F02D 23/00 | (2006.01) | |
| F02B 75/04 | (2006.01) | |
| F02D 15/04 | (2006.01) | |
| F01L 1/34 | (2006.01) | |
| F02D 13/02 | (2006.01) | |
| F01L 1/344 | (2006.01) | |
| F02B 37/18 | (2006.01) | |
| F02B 37/22 | (2006.01) | |

(52) U.S. Cl.
CPC ........ *F02D 13/0238* (2013.01); *F02D 13/0269* (2013.01); *F02D 15/04* (2013.01); *F02B 75/041* (2013.01); *F01L 1/3442* (2013.01); *F02B 37/18* (2013.01); *F02B 37/22* (2013.01); *Y02T 10/142* (2013.01); *F01L 2001/34496* (2013.01)

USPC ....... 60/602; 123/48 C; 123/48 R; 123/90.15; 701/102

(58) Field of Classification Search
USPC ....... 123/48 C, 48 R, 90.15; 701/102; 60/602
See application file for complete search history.

(56) References Cited

U.S. PATENT DOCUMENTS

| | | | |
|---|---|---|---|
| 2007/0119428 A1* | 5/2007 | Leone et al. ............ | 123/527 |
| 2008/0127933 A1* | 6/2008 | Blumberg et al. ........ | 123/304 |
| 2008/0190406 A1* | 8/2008 | Akihisa et al. ........... | 123/78 C |

(Continued)

FOREIGN PATENT DOCUMENTS

| | | | |
|---|---|---|---|
| JP | 62070633 A | * | 4/1987 |
| JP | 62078440 A | * | 4/1987 |

(Continued)

*Primary Examiner* — Thomas Denion
*Assistant Examiner* — Jessica Kebea
(74) *Attorney, Agent, or Firm* — Sughrue Mion, PLLC

(57) ABSTRACT

A spark ignition-type internal combustion is provided wherein a first mechanical compression ratio control and a second mechanical compression ratio control are alternatively carried out, the first mechanical compression ratio control makes the mechanical compression ratio in the low engine load side operation area higher than that in the high engine load side operation area to increase the expansion ratio in the low engine load side operation area, the second mechanical ratio control makes the expansion ratio in the low engine load side operation area lower than that in the low engine load side operation area made by the first mechanical compression ratio control and a boost pressure control increases the boost pressure like a step change when the engine load becomes a set engine load in the low engine load side operation area or higher.

3 Claims, 12 Drawing Sheets

(56) References Cited

U.S. PATENT DOCUMENTS

| | | | |
|---|---|---|---|
| 2010/0031924 A1* | 2/2010 | Sun et al. | 123/435 |
| 2010/0294245 A1* | 11/2010 | Yoshioka et al. | 123/48 R |

FOREIGN PATENT DOCUMENTS

| | | | |
|---|---|---|---|
| JP | 63-120820 A | | 5/1988 |
| JP | 63-150048 U | | 10/1988 |
| JP | 2002-038961 A | | 2/2002 |
| JP | 2004-218522 A | | 8/2004 |
| JP | 2004218522 A | * | 8/2004 |
| JP | 2005-067591 A | | 3/2005 |
| JP | 2006-283601 A | | 10/2006 |
| JP | 2006291934 A | * | 10/2006 |
| JP | 2007-303423 A | | 11/2007 |
| JP | 2008196407 A | * | 8/2008 |
| WO | 2009/091077 A1 | | 7/2009 |
| WO | WO 2009091077 A1 | * | 7/2009 |

* cited by examiner

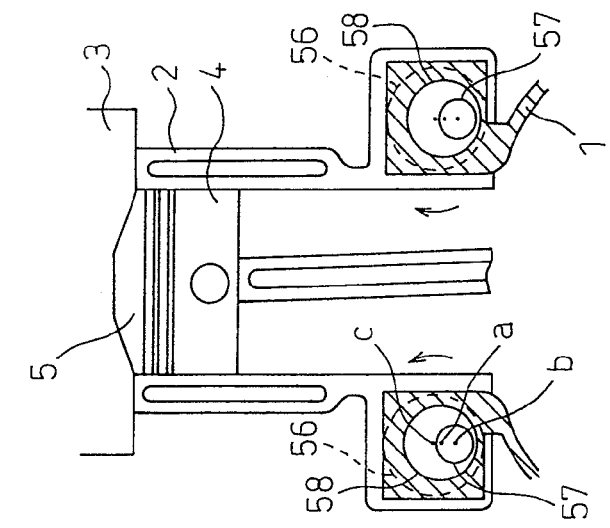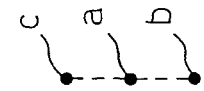
FIG.3A
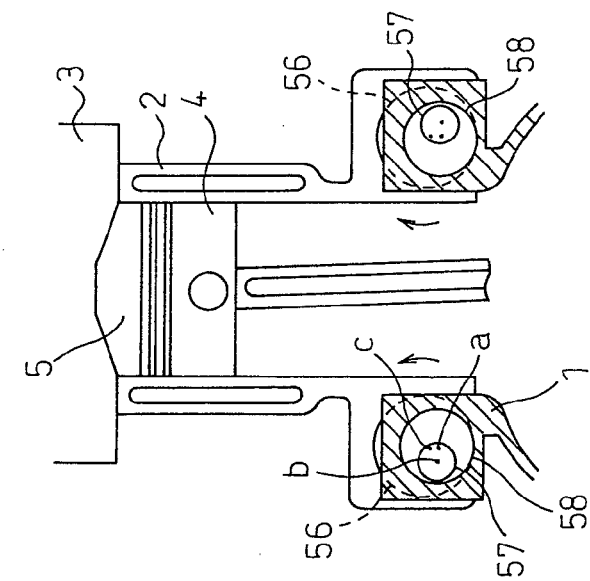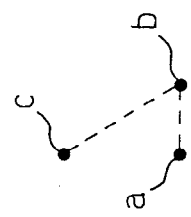
FIG.3B
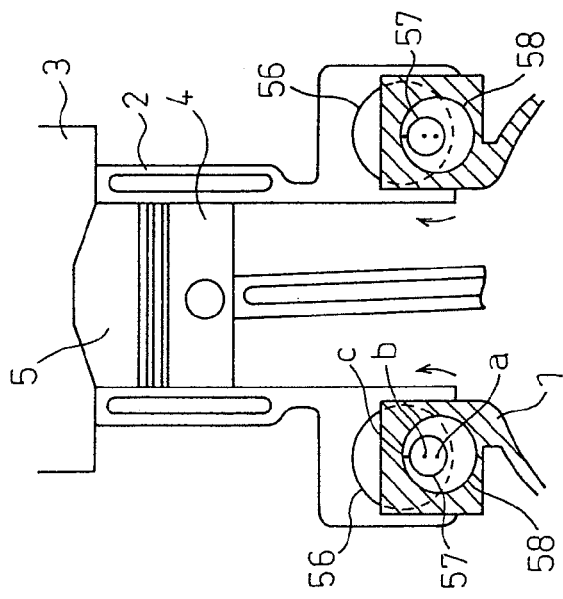
FIG.3C

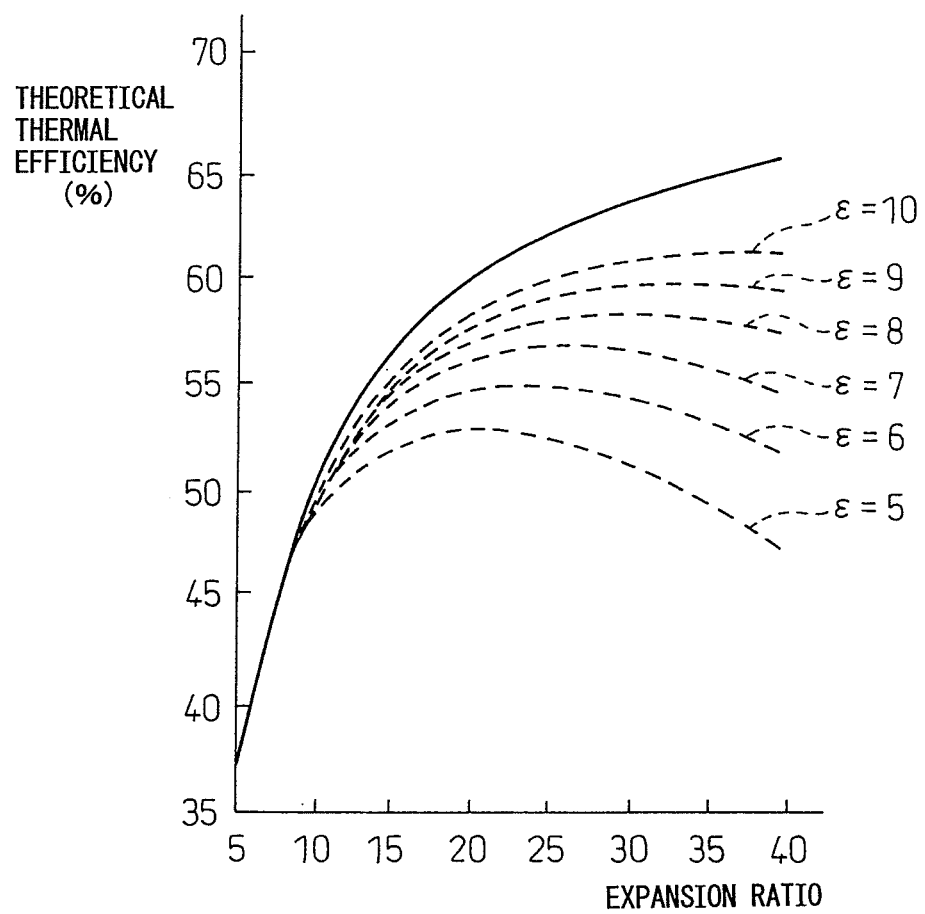

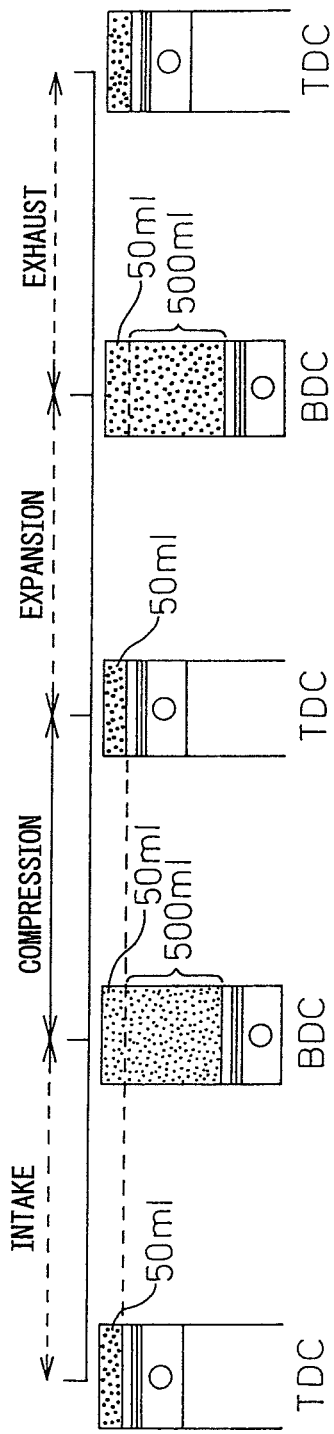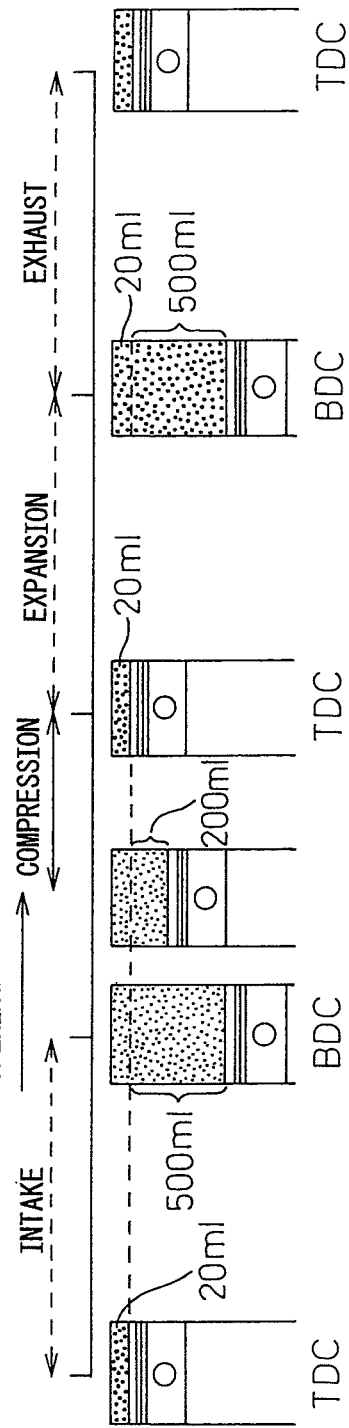

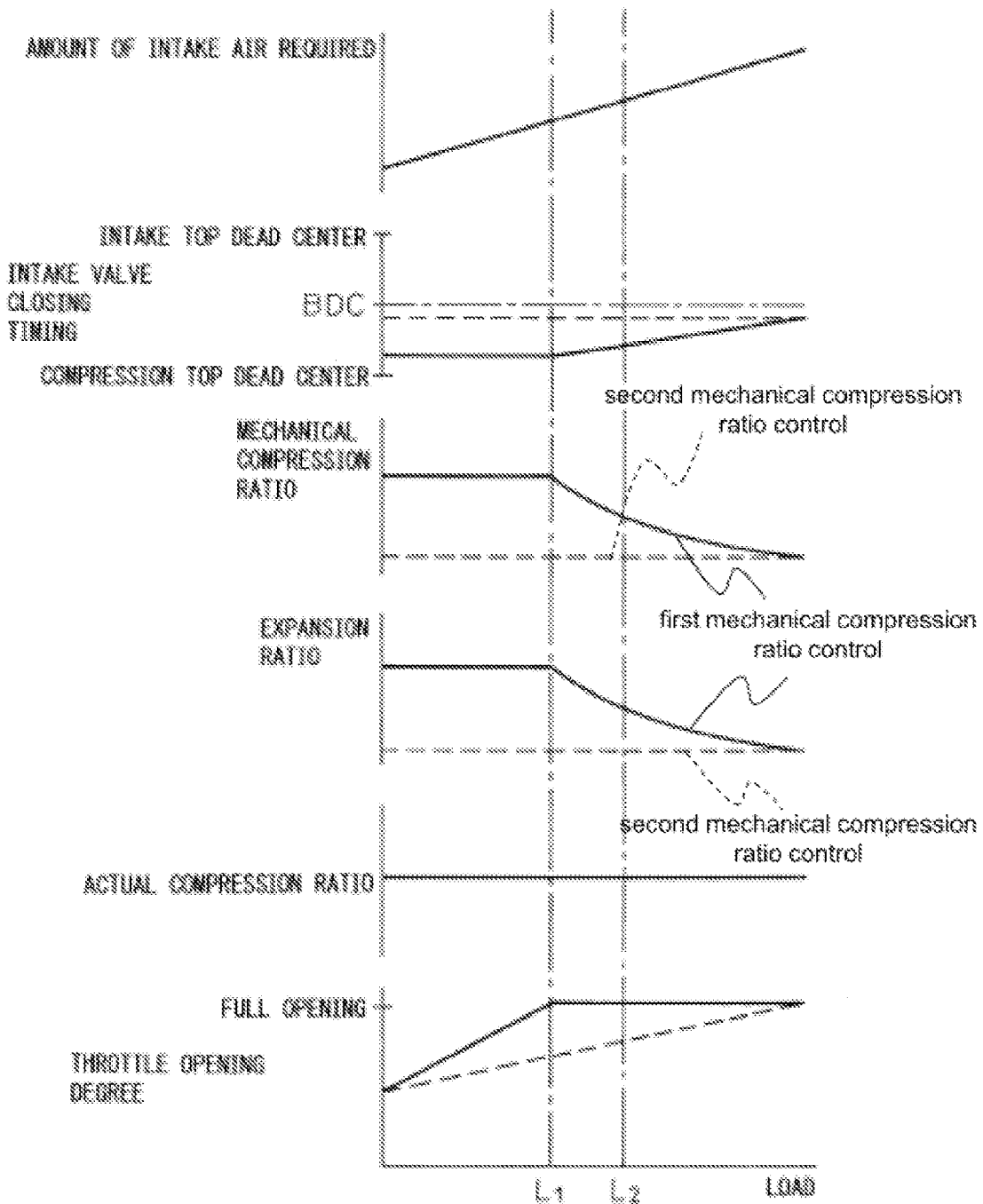

SPARK IGNITION-TYPE INTERNAL COMBUSTION ENGINE

TECHNICAL FIELD

The present invention relates to a spark ignition-type internal combustion engine.

BACKGROUND ART

In a spark ignition-type internal combustion engine, generally, the lower the engine load is, the worse the heat efficiency becomes. Therefore, it has been proposed that the mechanical compression ratio in the low engine load side operation area is increased by a variable compression ratio mechanism higher than that in the high engine load side operation area, to increase the expansion ratio and thereby improve the heat efficiency (refer to Japanese Unexamined Patent Publication Nos. 2007-303423, 2005-067591, 2006-283601, and 2002-038961).

In such a spark ignition-type internal combustion engine with a variable compression ratio mechanism, even when in the low engine load side operation area the engine load is a set engine load or over, it is preferable to increase the engine output by supercharging. For this purpose, when the engine load reaches the set engine load, for example, the electromagnetic clutch connects the engine drive shaft and the supercharger to make the supercharger in a non-operating state operate and thus the boost pressure is increased like a step change.

DISCLOSURE OF THE INVENTION

Incidentally, when the heat efficiency is improved, the temperature of exhaust gas is lowered. Accordingly, while the catalytic device is warming up immediately after engine startup, it is preferable that even in the low engine load side operation area the mechanical compression ratio is made low like in the high engine load side operation area and the expansion ratio is made low so as to not improve the heat efficiency.

However, in this way, if the heat efficiency in the low engine load side operation area is made low, the engine operation area to realize the low fuel consumption shifts to the low engine speed and high engine load side. Therefore, by using of the transmission, it is preferable to decrease the engine speed and to increase the engine load such that the engine output is maintained. Accordingly, the frequency of operating in about the set engine load is increased. Therefore the engine load frequently becomes higher or lower than the set engine load and thus drivability extremely deteriorates because increasing and decreasing the boost pressure is repeated like a step change.

Accordingly, an object of the present invention is to provide a spark ignition-type internal combustion engine wherein a first mechanical compression ratio control and a second mechanical compression ratio control are alternatively carried out, the first mechanical compression ratio control makes the mechanical compression ratio in the low engine load side operation area higher than that in the high engine load side operation area to increase the expansion ratio in the low engine load side operation area, the second mechanical ratio control makes the expansion ratio in the low engine load side operation area lower than that in the low engine load side operation area made by the first mechanical compression ratio control and a boost pressure control increases the boost pressure like a step change when the engine load becomes a set engine load in the low engine load side operation area or over, which can restrain deterioration of drivability when the second mechanical compression ratio control is carried out.

A spark ignition-type internal combustion engine provides that a first mechanical compression ratio control and a second mechanical compression ratio control are alternatively carried out, the first mechanical compression ratio control makes the mechanical compression ratio in the low engine load side operation area higher than that in the high engine load side operation area to increase the expansion ratio in the low engine load side operation area, the second mechanical ratio control makes the expansion ratio in the low engine load side operation area lower than that in the low engine load side operation area made by the first mechanical compression ratio control and a boost pressure control increases the boost pressure like a step change when the engine load becomes a set engine load in the low engine load side operation area or higher, is provided, characterized in that the set engine load of the boost pressure control when the second mechanical compression ratio control is carried out is set higher than that when the first mechanical compression ratio control is carried out.

A spark ignition-type internal combustion engine further provides that when the engine load becomes the set engine load or higher, the boost pressure control makes an engine driven-type or electrically driven-type supercharger in a non-operating state operate to increase the boost pressure like a step change.

A spark ignition-type internal combustion engine further provides that when the engine load becomes the set engine load or higher, the boost pressure control makes an opening degree of a waste gate valve small to increase the boost pressure like a step change by a turbocharger.

A spark ignition-type internal combustion engine further provides that when the engine load becomes the set engine load or higher, the boost pressure control makes an angle of variable nozzles of a variable nozzle-type turbocharger change to increase the boost pressure like a step change by the variable nozzle-type turbocharger.

When the first mechanical compression ratio control is carried out, if the engine load becomes the set engine load or higher, the boost pressure is increased like a step change to satisfactorily increase the engine output. On the other hand, for example, when the second mechanical compression ratio control is carried out to warm up the catalytic device, because the expansion ratio in the low engine load side operation area is lower than that in the low engine load side operation area made by the first mechanical compression ratio control to make the heat efficiency low, the engine operation area to realize the low fuel consumption shifts to the low engine speed and high engine load side. Accordingly, it is preferable to decrease the engine speed and to increase the engine load by using the transmission, such that the engine output is maintained. Therefore, if the set engine load in the boost pressure control is maintained, the frequency of operating in about the set engine load is increased so that the engine load frequently becomes higher or lower than the set engine load and thus the drivability extremely deteriorates because increasing and decreasing the boost pressure is repeated like a step change. However, according to the spark ignition-type internal combustion engine discussed above, the set engine load in the boost pressure control when the second mechanical compression ratio control is carried out is made higher than that when the first mechanical compression ratio control is carried out so that even if by using the transmission the engine speed is decreased and the engine load is increased such that the engine output is maintained, the engine load does not frequently become higher or lower than the set engine load and thus the deterioration of the drivability caused by the change of the boost pressure can be restrained.

According to the spark ignition-type internal combustion engine, when the engine load becomes the set engine load or higher, the boost pressure control makes an engine driven-type or electrically driven-type supercharger in a non-operating state operate to increase the boost pressure like a step change. Therefore, the boost pressure can be easily increased like a step change.

According to the spark ignition-type internal combustion engine, when the engine load becomes the set engine load or higher, the boost pressure control makes an opening degree of a waste gate valve small to increase the boost pressure like a step change by a turbocharger. Therefore, the boost pressure can be easily increased like a step change.

According to the spark ignition-type internal combustion engine, when the engine load becomes the set engine load or higher, the boost pressure control makes an angle of variable nozzles of a variable nozzle-type turbocharger change to increase the boost pressure like a step change by the variable nozzle-type turbocharger. Therefore, the boost pressure can be easily increased like a step change.

BRIEF DESCRIPTION OF THE DRAWINGS

FIG. 3A, FIG. 3B and FIG. 3C are side cross-sectional views of an internal combustion engine schematically illustrated.

FIG. 7 is a view showing the relationship of the theoretical thermal efficiency and expansion ratio.

FIG. 8A and FIG. 8B are views for explaining an ordinary cycle and superhigh expansion ratio cycle.

FIG. 9 is a view showing changes in the mechanical compression ratio, etc. in accordance with the engine load.

BEST MODE FOR CARRYING OUT THE INVENTION

Figure 1:
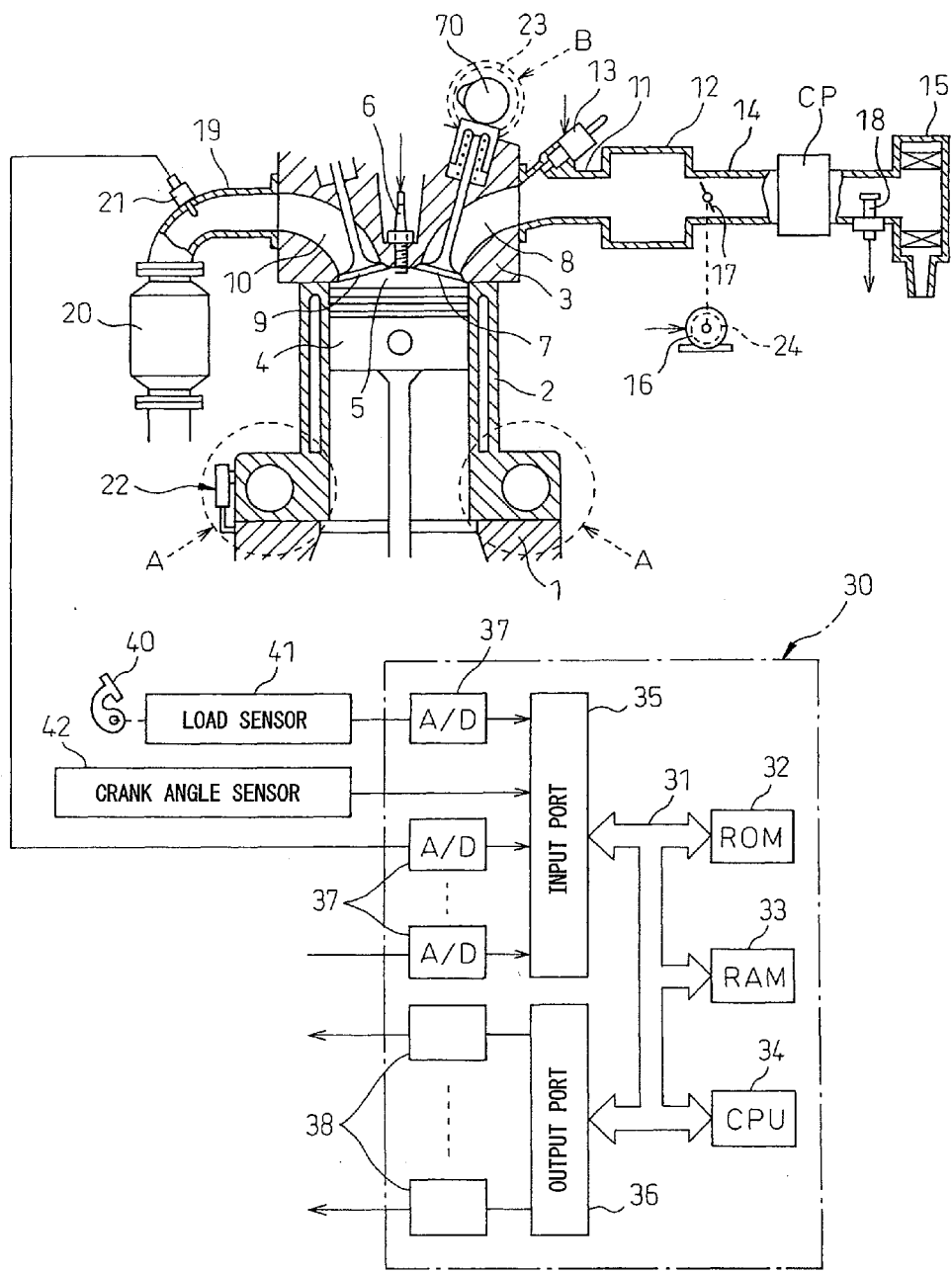
FIG. 1 is an overall view of a spark ignition-type internal combustion engine.

FIG. 1 is a side cross-sectional view of a spark ignition-type internal combustion engine according to the present invention. Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an air cleaner 15, and the intake duct 14 is provided inside it with a throttle valve 17 driven by an actuator 16 and an intake air amount detector 18 using for example a hot wire. On the other hand, the exhaust port 10 is connected through an exhaust manifold 19 to a catalytic converter 20 housing for example a three-way catalyst. The exhaust manifold 19 is provided with an air-fuel ratio sensor 21 inside.

Further, in the embodiment shown in FIG. 1, the connecting part of the crank case 1 and the cylinder block 2 is provided with a variable compression ratio mechanism (A) able to change the relative positions of the crank case 1 and cylinder block 2 in the cylinder axial direction so as to change the volume of the combustion chamber 5 when the piston 4 is positioned at compression top dead center. The internal combustion engine is further provided with a mechanism (B) for changing the start timing of actual compression action. In the embodiment shown in FIG. 1, the mechanism (B) is a variable valve timing mechanism able to change the closing timing of the intake valve 7. Further, in the spark ignition-type internal combustion engine of the present embodiment, a compressor CP of a supercharger (e.g., an electrically driven supercharger, a mechanically driven supercharger, and a variable nozzle supercharger) is arranged in the intake duct 14 and the engine output can be increased by pressure-charging. The compressor CP is an engine driven-type and is connected mechanically to the engine drive shaft via an electromagnetic clutch (not shown).

As shown in FIG. 1, a relative position sensor 22 for detecting the relative positions of the crank case 1 and the cylinder block 2 is mounted on the crank case 1 and the cylinder block 2 and the relative position sensor 22 generates an output signal showing the change of distance between the crank case 1 and the cylinder block 2. Further, a valve timing sensor 23 for generating an output signal showing the closing timing of the intake valve 7 is mounted on the variable valve timing mechanism (B). A throttle opening degree sensor 24 for generating an output signal showing the opening degree of the throttle valve is mounted on the actuator 16 for driving the throttle valve.

The electronic control unit 30 is comprised of a digital computer provided with components connected to each other through a bidirectional bus 31 such as a ROM (read only memory) 32, RAM (random access memory) 33, CPU (microprocessor) 34, input port 35, and output port 36. The output signals of the intake air amount detector 18, of the air-fuel ratio sensor 21, of the relative position sensor 22, of the valve timing sensor, and of the throttle opening degree sensor 24 are respectively input through corresponding AD converters 37 to the input port 35. Further, the accelerator pedal 40 is connected to a load sensor 41 generating an output voltage proportional to the amount of depression L of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30 degrees. On the other hand, the output port 36 is connected through the corresponding drive circuits 38 to a spark plug 6, fuel injector 13, throttle valve drive actuator 16, variable compression ratio mechanism (A) and variable valve timing mechanism (B). Further, the electromagnetic clutch of the supercharger is also connected to the output port 36 through the corresponding drive circuit 38.

Figure 2:
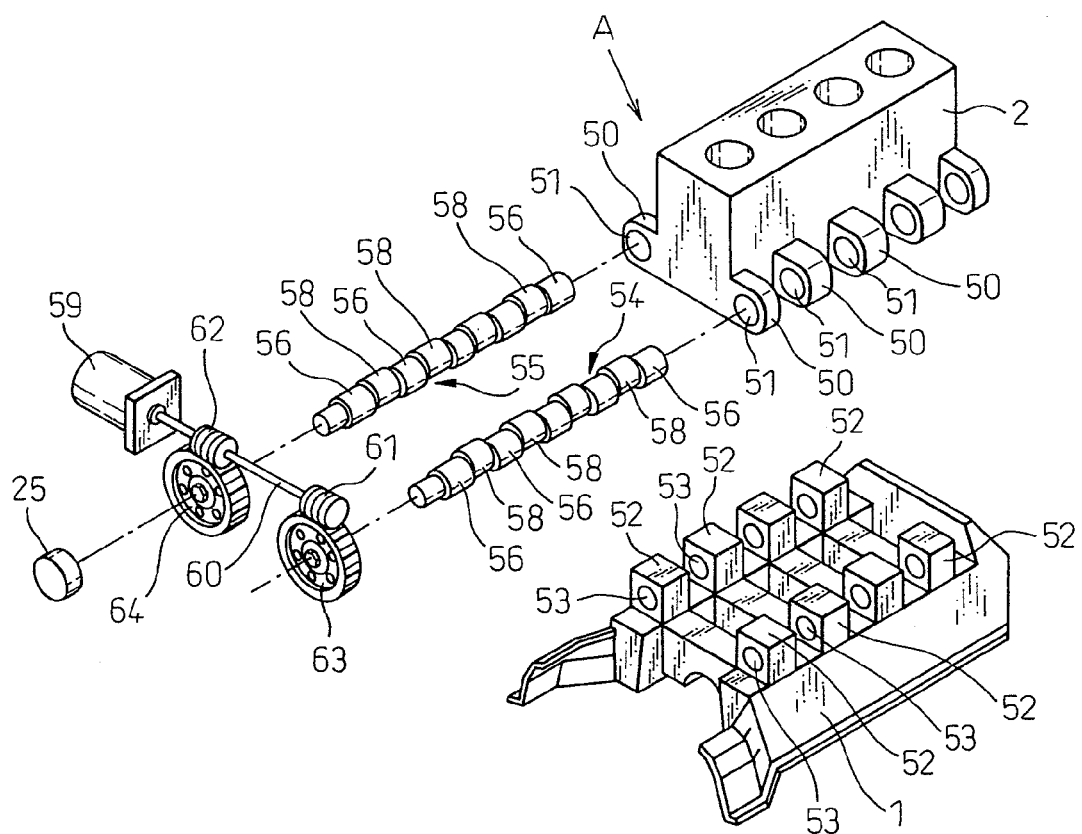
FIG. 2 is an exploded perspective view of a variable compression ratio mechanism.

FIG. 2 is an exploded perspective view of the variable compression ratio mechanism (A) shown in FIG. 1, while FIG. 3A FIG. 3B and FIG. 3C are side cross-sectional views of the internal combustion engine schematically illustrated. Referring to FIG. 2, at the bottom of the both side walls of the cylinder block 2, a plurality of projecting parts 50 separated from each other by a fixed distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54 and 55 is provided. Each of the cam shafts 54 and 55 has circular cams 58 fixed on it able to be rotatably inserted in the cam insertion holes 53 at every other position. These circular cams 58 are coaxial with the axes of rotation of the cam shafts 54 and 55. On the other hand, in the both sides of each circular cam 58, as shown in FIG. 3A, FIG. 3B and FIG. 3C, extend eccentric shafts 57 arranged eccentrically with respect to the axes of rotation of the cam shafts 54 and 55. Each eccentric shaft 57 has other circular cams 56 rotatably attached to it eccentrically. As shown in FIG. 2, these circular cams 56 are arranged in the both sides of each circular cam 58. These circular cams 56 are rotatably inserted in the corresponding cam insertion holes 51. Further, as shown in FIG. 2, a cam rotational angle sensor 25 which generates an output pulse showing the rotational angle of the cam shaft 55 is mounted on the cam shaft 55.

When the circular cams 58 fixed on each of the cam shafts 54, 55 are rotated in opposite directions each other as shown by the arrows in FIG. 3A from the state shown in FIG. 3A, the eccentric shafts 57 move in the opposite directions each other, so the circular cams 56 rotate in the opposite directions of the circular cams 58 in the cam insertion holes 51. Therefore, the positions of the eccentric shafts 57 shift from the high positions to the middle positions as shown in FIG. 3B. Next, when the circular cam 58 are further rotated in the direction as shown by the arrow, the positions of the eccentric shafts 57 shift to the lowest positions as shown in FIG. 3C.

FIG. 3A, FIG. 3B, and FIG. 3C show positional relationships among the center (a) of the circular cam 58, the center (b) of the eccentric shaft 57, and the center (c) of the circular cam 56.

As will be understood from a comparison of FIG. 3A, FIG. 3B, and FIG. 3C, the relative positions of the crank case 1 and cylinder block 2 are determined by the distance between the center (a) of the circular cam 58 and the center (c) of the circular cam 56. The larger the distance between the center (a) of the circular cam 58 and the center (c) of the circular cam 56, the further the cylinder block 2 moves from the crank case 1. Namely, the variable compression ratio mechanism (A) varies the relative position between the crank case 1 and the cylinder block 2 by a crank mechanism using the rotating cams. If the cylinder block 2 moves away from the crank case 1, the volume of the combustion chamber 5 when the piston 4 is positioned at compression top dead center increases, therefore by making the cam shafts 54, 55 rotate, the volume of the combustion chamber 5 when the piston 4 is positioned at compression top dead center can be changed.

As shown in FIG. 2, to make the cam shafts 54 and 55 rotate in opposite directions respectively, the shaft of a drive motor 59 is provided with a pair of worm gears 61 and 62 with opposite thread directions. Gears 63 and 64 engaging with these worm gears 61 and 62 are fastened to ends of the cam shafts 54 and 55, respectively. In this embodiment, the drive motor 59 can be driven to change the volume of the combustion chamber 5 when the piston 4 is positioned at compression top dead center over a broad range.

Figure 4:
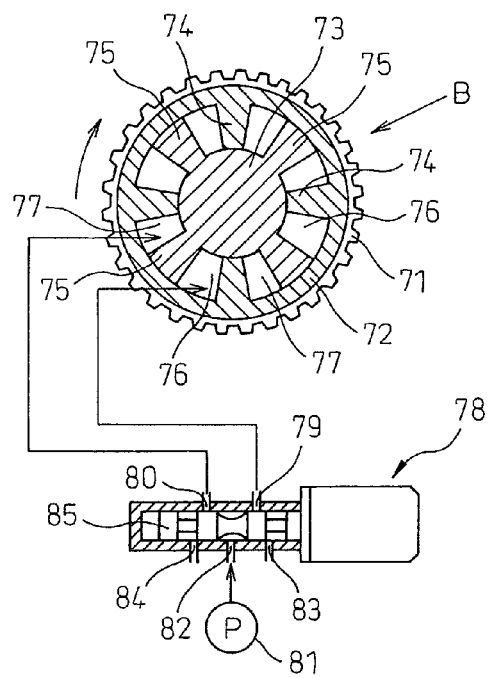
FIG. 4 is a view showing a variable valve timing mechanism.

On the other hand, FIG. 4 shows a variable valve timing mechanism (B) attached to the end of the cam shaft 70 for driving the intake valve 7 in FIG. 1. As shown in FIG. 4, the variable valve timing mechanism (B) is provided with a timing pulley 71 made to rotate by an engine crank shaft through a timing belt in the arrow direction, a cylindrical housing 72 rotating together with the timing pulley 71, a rotation shaft 73 able to rotate together with the cam shaft 70 for driving the intake valve and to rotate relative to the cylindrical housing 72, a plurality of partitions 74 extending from an inside circumference of the cylindrical housing 72 to an outside circumference of the rotation shaft 73, and vanes 75 extending between the partitions 74 from the outside circumference of the rotation shaft 73 to the inside circumference of the cylindrical housing 72. Advancing use hydraulic chambers 76 and retarding use hydraulic chambers 77 are formed in the both sides of the vanes 75.

The feed of working oil to the hydraulic chambers 76 and 77 is controlled by a working oil feed control valve 78. This working oil feed control valve 78 is provided with hydraulic ports 79 and 80 connected to the hydraulic chambers 76 and 77, a feed port 82 for feeding working oil discharged from a hydraulic pump 81, a pair of drain ports 83, 84, and a spool valve 85 for controlling connection and disconnection of the ports 79, 80, 82, 83 and 84.

To advance the phase of the cams of the cam shaft 70 for driving the intake valve, the spool valve 85 is made to move right in FIG. 4, working oil fed from the feed port 82 is fed through the hydraulic port 79 to the advancing use hydraulic chambers 76, and working oil in the retarding use hydraulic chambers 77 is drained from the drain port 84. At this time, the rotation shaft 73 is made to rotate relative to the cylindrical housing 72 in the arrow direction.

As opposed to this, to retard the phase of the cams of the cam shaft 70 for driving the intake valve, the spool valve 85 is made to move left in FIG. 4, working oil fed from the feed port 82 is fed through the hydraulic port 80 to the retarding use hydraulic chambers 77, and working oil in the advancing use hydraulic chambers 76 is drained from the drain port 83. At this time, the rotation shaft 73 is made to rotate relative to the cylindrical housing 72 in the direction opposite to the arrow direction.

When the rotation shaft 73 is made to rotate relative to the cylindrical housing 72, if the spool valve 85 is returned to the neutral position shown in FIG. 4, the operation for relative rotation of the rotation shaft 73 is ended, and the rotation shaft 73 is held at the relative rotational position at that time. Therefore, it is possible to use the variable valve timing mechanism (B) so as to advance or retard the phase of the cam of the cam shaft 70 for driving the intake valve by exactly the desired amount.

Figure 5:
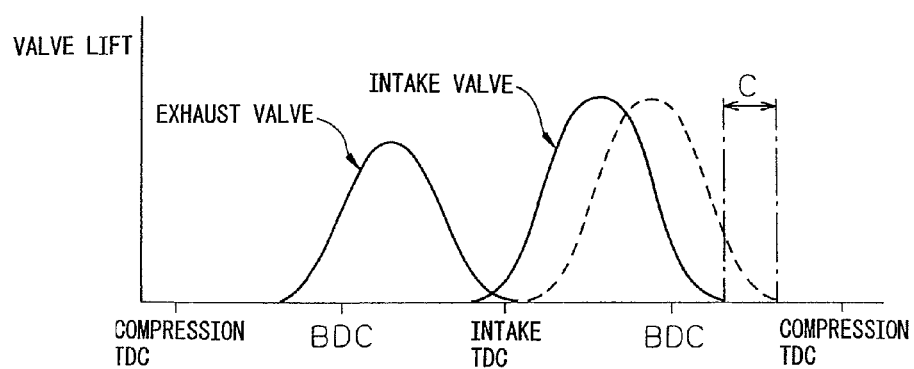
FIG. 5 is a view showing an amount of lift of an intake valve and exhaust valve.

In FIG. 5, the solid line shows the case where the phase of the cams of the cam shaft 70 for driving the intake valve is maximally advanced by the variable valve timing mechanism (B), and the broken line shows the case where the phase of the cams of the cam shaft 70 for driving the intake valve is maximally retarded. Therefore, the opening period of the intake valve 70 can be freely set between the period shown in the solid line and the period shown in the broken line in FIG. 5, and thus the closing timing of the intake valve 7 can be set to a given crank angle within the range indicated by the arrow C in FIG. 5.

Note that the variable valve timing mechanism (B) shown in FIG. 1 and FIG. 4 shows an example. It is also possible to use various types of variable valve timing mechanisms, such as a variable valve timing mechanism able to change the closing timing of the intake valve with the opening timing thereof maintained constant.

Figure 6A:
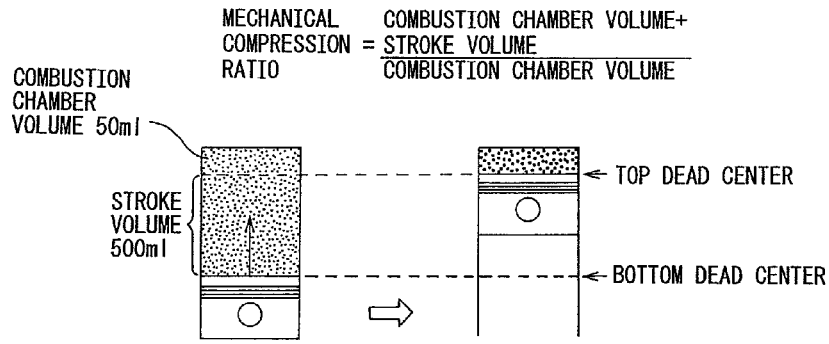
FIG. 6A, FIG. 6B and FIG. 6C are views for explaining a mechanical compression ratio, an actual compression ratio and an expansion ratio.
Figure 6B:
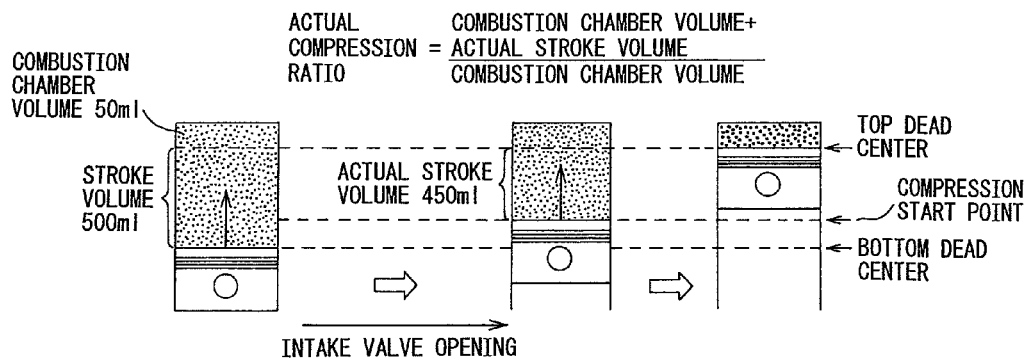
Figure 6C:
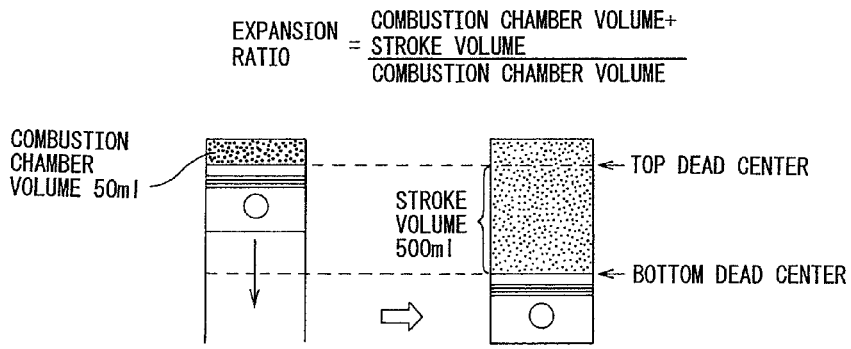

Next, the meaning of the terms used in the present application will be explained with reference to FIG. 6A to FIG. 6C. Note that FIG. 6A, FIG. 6B and FIG. 6C show for explanatory purposes an engine with a volume of the combustion chambers of 50 ml and a stroke volume of the piston of 500 ml. In these FIG. 6A, FIG. 6B and FIG. 6C, the combustion chamber volume shows the volume of the combustion chamber when the piston is at compression top dead center.

FIG. 6A explains the mechanical compression ratio. The mechanical compression ratio is a value determined mechanically from the stroke volume of the piston at the time of a compression stroke and combustion chamber volume. This mechanical compression ratio is expressed by (combustion chamber volume+stroke volume)/combustion chamber volume. In the example shown in FIG. 6A, this mechanical compression ratio becomes (50 ml+500 ml)/50 ml=11.

FIG. 6B explains the actual compression ratio. This actual compression ratio is a value determined from the combustion chamber volume and the actual stroke volume of the piston from when the compression action is actually started to when the piston reaches top dead center. This actual compression ratio is expressed by (combustion chamber volume+actual stroke volume)/combustion chamber volume. That is, as shown in FIG. 6B, even if the piston starts to rise in the compression stroke, no compression action is performed while the intake valve is opened. The actual compression action is started after the intake valve closes. Therefore, the actual compression ratio is expressed as above using the actual stroke volume. In the example shown in FIG. 6B, the actual compression ratio becomes (50 ml+450 ml)/50 ml=10.

FIG. 6C explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6C, this expansion ratio becomes (50 ml+500 ml)/50 ml=11.

Next, superhigh expansion ratio cycle of the present invention will be explained with reference to FIG. 7, FIG. 8A and FIG. 8B. Note that FIG. 7 shows the relationship between the theoretical thermal efficiency and the expansion ratio, while FIG. 8A and FIG. 8B show a comparison between the ordinary cycle and the superhigh expansion ratio cycle, which are used selectively in accordance with the load in the present invention.

FIG. 8A shows the ordinary cycle wherein the intake valve closes near the bottom dead center and the compression action by the piston is started from near substantially compression bottom dead center. In the example shown in this FIG. 8A as well, in the same way as the examples shown in FIGS. 6A, 6B and 6C, the combustion chamber volume is made 50 ml, and the stroke volume of the piston is made 500 ml. As will be understood from FIG. 8A, in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised at the maximum to about 12, accordingly, in an ordinary cycle, the theoretical thermal efficiency cannot be made sufficiently high.

On the other hand, under this situation, the inventors strictly differentiated between the mechanical compression ratio and the actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line of $\epsilon=10$ in FIG. 7 shows the theoretical thermal efficiency in the case of fixing the actual compression ratio at 10 and raising the expansion ratio in that state. It is shown that the amount of rise of the theoretical thermal efficiency when raising the expansion ratio in the state where the actual compression ratio $\epsilon$ is maintained at a low value in the above way and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8B shows an example of the case when using the variable compression ratio mechanism (A) and variable valve timing mechanism (B) to maintain the actual compression ratio at a low value and raise the expansion ratio.

Referring to FIG. 8B, in this example, the variable compression ratio mechanism (A) is used to lower the combustion chamber volume from 50 ml to 20 ml. On the other hand, the variable valve timing mechanism (B) is used to retard the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8A, as explained above, the actual compression ratio is about 11 and the expansion ratio is 11. Compared with this case, in the case shown in FIG. 8B, it is learned that only the expansion ratio is raised to 26. This is the reason that it is called the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8B, the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8B is set, while at the time of engine high load operation, the ordinary cycle shown in FIG. 8A is set.

Next, the operational control as a whole will be explained with reference to FIG. 9. FIG. 9 shows the changes in the amount of intake air, the closing timing of the intake valve, the mechanical compression ratio, the expansion ratio, the actual compression ratio, and the opening degree of the throttle valve 17, according to the engine load at a given engine speed. Note that in FIG. 9, to enable the three-way catalyst in the catalytic converter 20 to simultaneously reduce the unburned HC, CO, and $NO_X$ in the exhaust gas, ordinarily the average air-fuel ratio in the combustion chamber 5 is feedback controlled to the stoichiometric air-fuel ratio based on the output signal of the air-fuel ratio sensor 21.

As explained above, at the time of engine high load operation, the ordinary cycle shown in FIG. 8A is executed. Therefore, as shown in FIG. 9, at this time, the mechanical compression ratio is made low so that the expansion ratio is low and, as shown by the solid line in FIG. 9, the closing timing of the intake valve 7 is advanced as shown by the solid line in FIG. 5. Further, at this time, the amount of intake air is large and the opening degree of the throttle valve 17 is maintained fully opened state so that the pumping loss becomes zero.

On the other hand, as shown by the solid line in FIG. 9, along with the reduction in the engine load, to decrease the amount of intake air, the closing timing of the intake valve 7 is retarded. Further, at this time, as a first mechanical compression ratio control, the mechanical compression ratio is increased along with the reduction in the engine load as shown in FIG. 9 such that the actual compression ratio is held substantially constant. Therefore, the expansion ratio is also increased along with the reduction in the engine load. Further, at this time, the throttle valve 17 is held at the fully opened state, therefore the amount of intake air fed to the combustion chamber 5 is controlled not by the throttle valve 17 but by changing the closing timing of the intake valve 7.

In this way, when the engine load becomes lower from the engine high load operation state, the mechanical compression ratio is increased by the first mechanical compression ratio control along with the reduction in the intake air amount under a substantially constant actual compression ratio. That is, the volume of the combustion chamber 5 when the piston 4 reaches compression top dead center is reduced proportionally to the reduction in the intake air amount. Therefore, the volume of the combustion chamber 5 when the piston 4 reaches compression top dead center changes in proportion to the intake air amount. Note that, at this time, the air-fuel ratio in the combustion chamber 5 becomes the stoichiometric air-fuel ratio in the embodiment shown in FIG. 9, so the volume of the combustion chamber 5 when the piston 4 reaches compression top dead center changes in proportion to the amount of fuel.

If the engine load becomes further lower, the mechanical compression ratio is further increased. When the engine load is lower to the engine load L1 which is a middle engine load near the low engine load, the mechanical compression ratio reaches the limit mechanical compression ratio serving as the structural upper limit of the combustion chamber 5. When the mechanical compression ratio reaches the limit mechanical compression ratio, the mechanical compression ratio is held at the limit mechanical compression ratio in the region where the engine load is lower than the engine load L1 when the mechanical compression ratio reaches the limit mechanical compression ratio. Therefore, at the time of the middle engine load operation near the low engine load operation and the low engine load operation, namely at the low engine load operation side, the mechanical compression ratio becomes maximum and the expansion ratio also becomes maximum. In other words, at the low engine operation side, the mechanical compression ratio is made maximum so that the maximum expansion ratio is obtained.

On the other hand, in the embodiment shown in FIG. 9, when the engine load drops to L1, the closing timing of the intake valve 7 becomes the limit closing timing at which the amount of intake air supplied in the combustion chamber 5 can be controlled by changing the closing timing of the intake valve 7. When the closing timing of the intake valve 7 reaches the limit closing timing, the closing timing of the intake valve 7 is held at the limit closing timing in the region where the engine load is lower than the engine load L1 when the closing timing of the intake valve 7 reaches the limit closing timing.

If the closing timing of the intake valve 7 is held at the limit closing timing, the change of the closing timing of the intake valve 7 can no longer be used to control the intake air amount. In the embodiment shown in FIG. 9, at this time, that is, in the region of an engine load lower than the engine load L1 when the closing timing of the intake valve 7 reaches the limit closing timing, the throttle valve 17 is used to control the amount of intake air fed to the combustion chamber 5. The lower the engine load becomes, the smaller the opening degree of the throttle valve is made.

As explained above, in the superhigh expansion ratio cycle shown in FIG. 8B, the expansion ratio is made 26. The higher this expansion ratio, the more preferable, but as will be understood from FIG. 7, even for the practically usable lower limit compression ratio $\epsilon=5$, a considerably high theoretical thermal efficiency can be obtained if 20 or more. Therefore, in the present embodiment, the variable compression ratio mechanism (A) is formed so that the expansion ratio becomes 20 or more.

Thus, by the first mechanical compression ratio control, the mechanical compression ratio in the low engine load side operation area (including the engine load L1) when the engine load is lower than L2 is made higher than that in the high engine load side operation area when the engine load is L2 or over, so that the expansion ratio in the low engine load side operation area is made higher than that in the high engine load side operation area and therefore the thermal efficiency in the low engine load side operation area can be improved.

Figure 10:
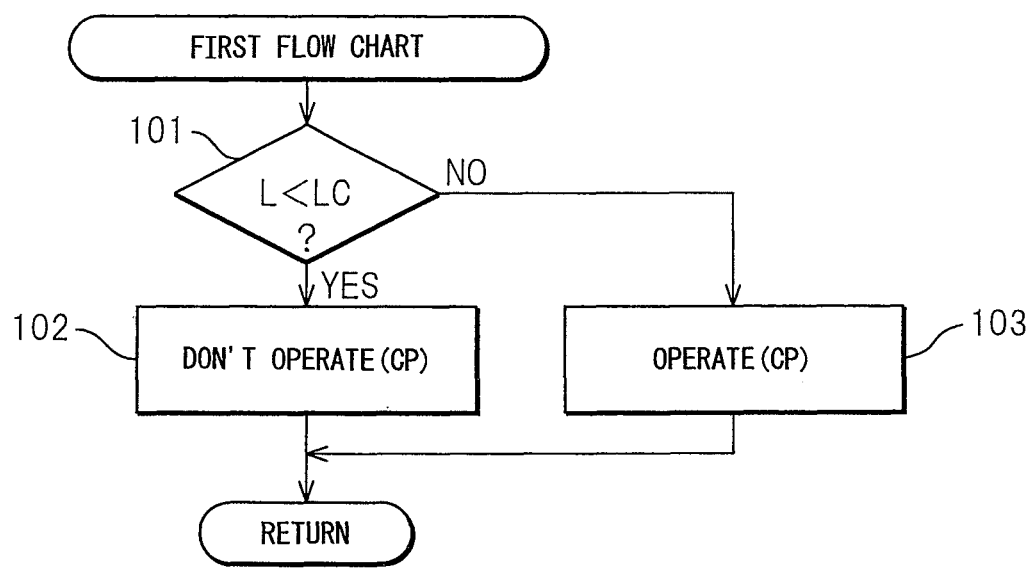
FIG. 10 is a first flow chart showing the boost pressure control.

In the spark ignition-type internal combustion engine with such a variable compression ratio mechanism (A), it is preferable to increase the engine output by supercharging when even in the low engine load side operation area the engine load is higher than a set engine load. FIG. 10 is a first flow chart showing the boost pressure control, and is repeatedly carried out every set period by the electronic control unit 30. First, at step 101, it is determined if the current engine load L on the basis of the output of the load sensor 41 is smaller than a set engine load LC. When the result is positive, at step 102, the engine drive shaft and the compressor CP are disconnected by the above mentioned electromagnetic clutch and thus the compressor CP is made non-operating condition. On the other hand, when the current engine load L becomes the set engine load LC or over, the result at step 101 is negative and at step 103, the engine drive shaft and the compressor CP are connected by the above mentioned electromagnetic clutch. Thus, the compressor CP is operated.

Figure 11:
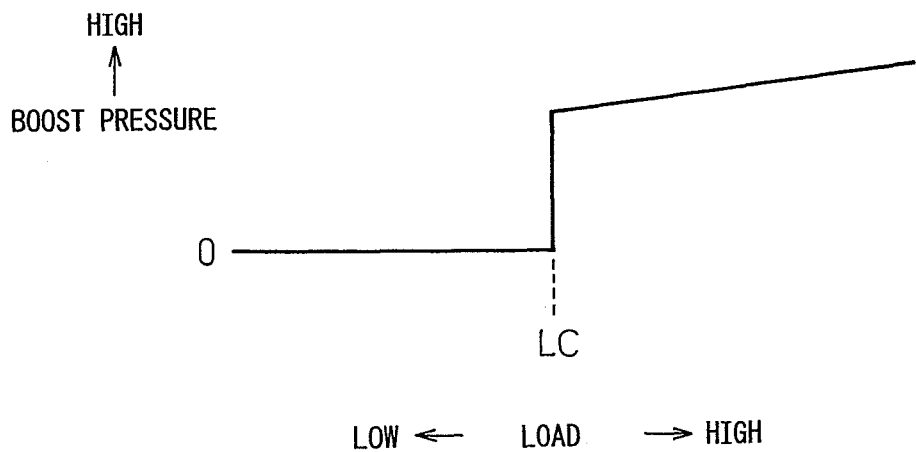
FIG. 11 is a graph showing the relationship between the engine load and the boost pressure.

Therefore, as shown in FIG. 11 which is a graph showing the relationship between the engine load and the boost pressure, when the engine load reaches the set engine load LC, the boost pressure is increased like a step change. Change of the boost pressure for change of the engine load at the set engine load LC becomes the maximum. Thus, when the engine load becomes the set engine load LC or over, the boost pressure is increased by the compressor CP and the engine output can be increased. The graph of FIG. 11 is an example and the boost pressure when the engine load is the set engine load LC or over changes according to the rotational speed of the engine drive shaft.

Incidentally, when the catalytic device 20 has not become the active temperature immediately after the engine startup, the catalytic device 20 does not sufficiently function and therefore warming up thereof is required. At this time, if the expansion ratio is increased to improve the heat efficiency, this becomes disadvantage for the early warming up of the catalytic device 20 because the temperature of exhaust gas is lowered. Further, in the idle operation, if the expansion ratio is increased, the combustion easily becomes unstable.

Accordingly, in the internal combustion engine of the present embodiment, as shown by the broken lines in FIG. 9, even if the engine load becomes low, the second compression ratio control maintains the compression ratio a constant value and also maintains the expansion ratio a constant value. Thus, it is also possible that the thermal efficiency in the low engine load side operation area is not improved. Further, when the second compression ratio control is carried out, as shown by the broken lines in FIG. 9, the closing timing of the intake valve 7 is maintained a constant timing immediately after the intake bottom dead center in spite of the engine load, and the actual compression ratio is also maintained a constant value. The opening degree of the throttle valve 17 is gradually decreased so as to decrease the amount of intake air along with the reduction in the engine load.

Thus, by the second compression ratio control, the mechanical compression ratio in the low engine load side operation area (including the engine load L1) when the engine load is lower than L2 is made equal to that in the high engine load side operation area when the engine load is L2 or over, so that the expansion ratio in the low engine load side operation area is made equal to that in the high engine load side operation area and therefore the expansion ratio in the low engine load side operation area is made lower than that in the low engine load side operation area when the first compression ratio control is carried out.

Figure 12:
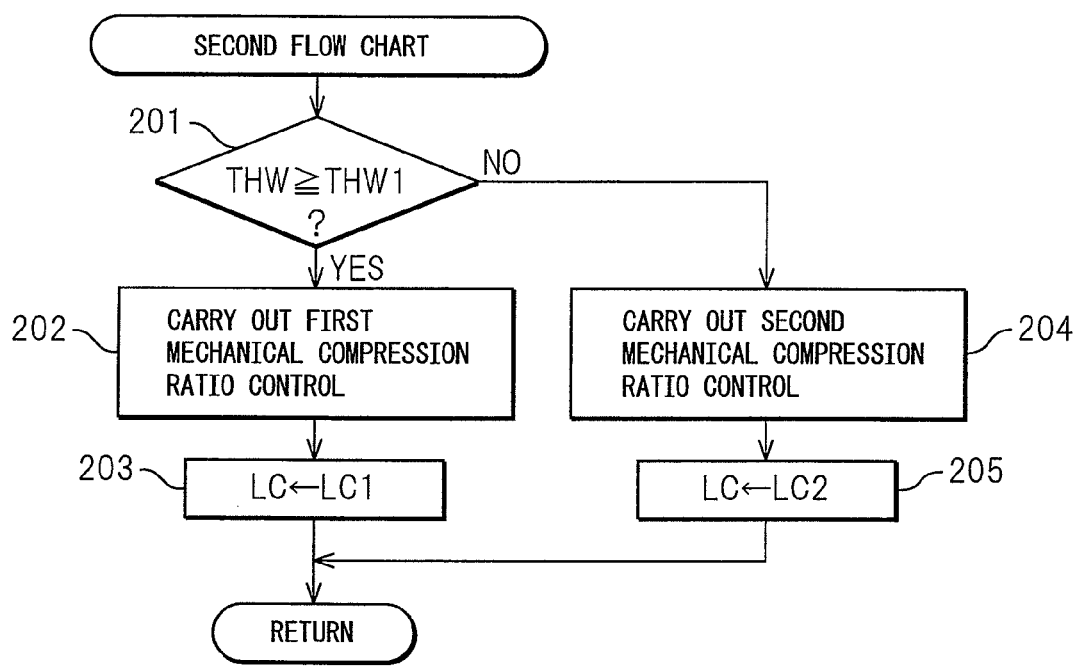
FIG. 12 is a second flow chart showing the changeover control of the first mechanical compression ratio control and the second mechanical compression ratio control.

FIG. 12 is a second flow chart showing changeover control of the first mechanical compression ratio control and the second mechanical compression ratio control, and is repeatedly carried out every set period by the electronic control unit 30. First, at step 201, it is determined if the temperature of the cooling water THW is a set temperature THW1 or over. When the result is positive, the catalytic device 20 becomes the active temperature or over and thus the warming up of the catalytic device 20 is not required. Therefore, at step 202, the first mechanical compression ratio control is carried out and thus the mechanical compression ratio in the low engine load side operation area (<L2) is made higher than that in the high engine load side operation area (>=L2). Accordingly, the expansion ratio in the low engine load side operation area is made higher than that in the high engine load side operation area to improve the thermal efficiency in the low engine load side operation. Next, at step 203, the set engine load LC for determining if the compressor CP is operated in the first flow chart shown in FIG. 10 is made a first set engine load LC1.

On the other hand, when the temperature of the cooling water THW is lower than the set temperature THW1, the catalytic device 20 has not become the active temperature and does not sufficiently function. At this time, if the first mechanical compression ratio control is carried out and the expansion ratio is increased, the temperature of exhaust gas is lowered. It is disadvantage for the warming up of the catalytic device to lower the temperature of exhaust gas. Therefore, at step 204, the second mechanical compression ratio control is carried out. Accordingly, the mechanical compression ratio in the low engine load side operation area is made lower than that in the low engine load side operation area when the first mechanical compression ratio control is carried out, and the expansion ratio in the low engine load side operation area is made lower than that in the low engine load side operation area when the first compression ratio control is carried out. Thus, the thermal efficiency in the low engine load side operation area is made low, and therefore the temperature of the exhaust gas increases. It is advantage for the warming up of the catalytic device 20 to increase the temperature of exhaust gas. As mentioned above, in the idle operation, if the expansion ratio is increased, the combustion easily becomes unstable. Accordingly, when the idle operation is carried out, the second mechanical compression ratio control may be carried out.

Figure 13A:
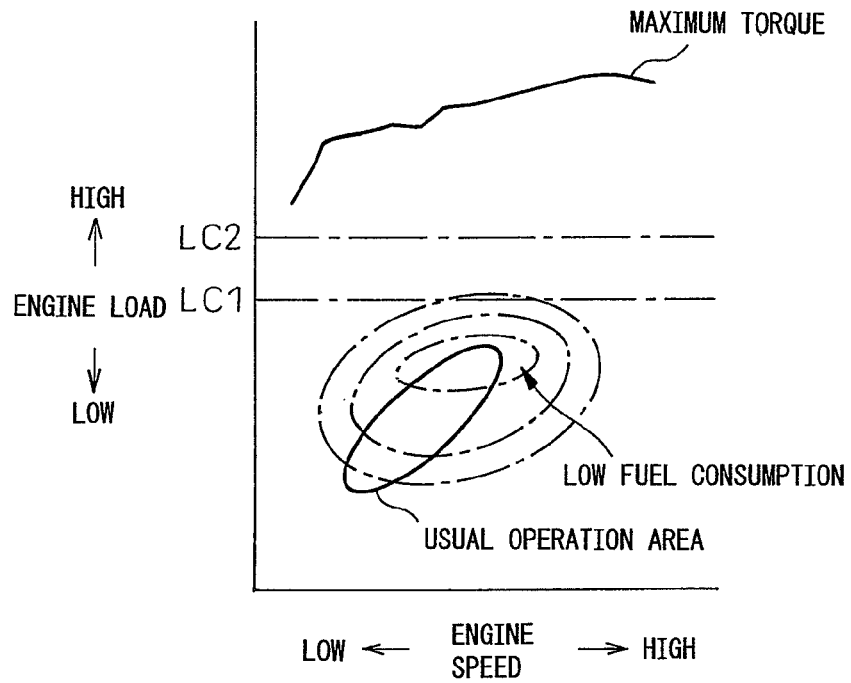
FIG. 13(A) is a map showing a usual operation area when the first mechanical compression ratio control is carried out.

FIG. 13(A) is a map showing a usual operation area when the first mechanical compression ratio control is carried out. In FIG. 13(A), an operation area to realize the low fuel consumption is shown by the chain line and it is preferable to operate in the overlapping area of the low fuel consumption operation area and the usual operation area surrounded by the solid line. As mentioned above, when the engine load is over the first set engine load LC1, the boost pressure is increased like a step change to satisfactorily increase the engine output.

Figure 13B:
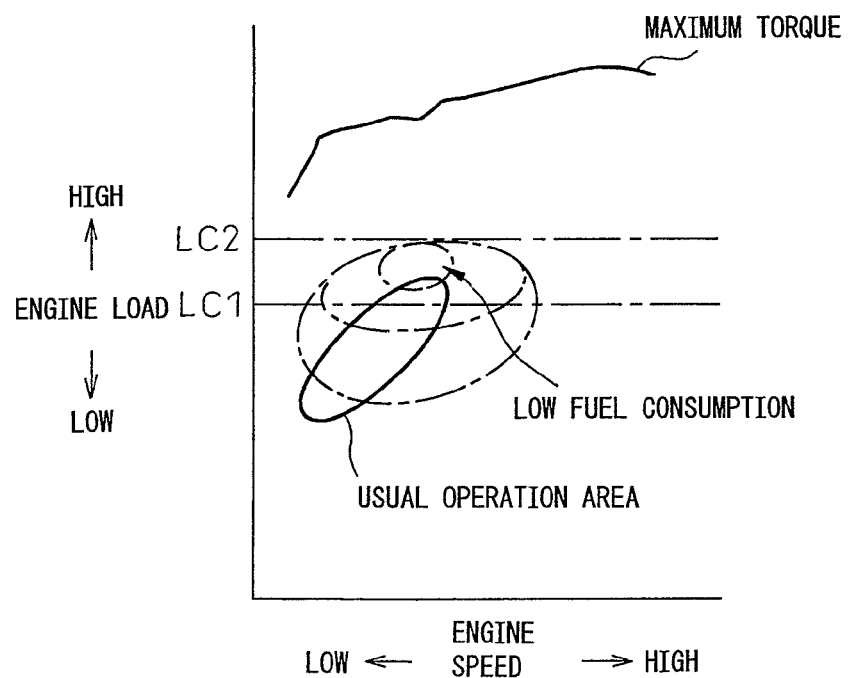
FIG. 13(B) is a map showing a usual operation area when the second mechanical compression ratio control is carried out.

On the other hand, FIG. 13(B) is a map showing a usual operation area when the second mechanical compression ratio control is carried out. By the second mechanical compression ratio control, the expansion ratio is made low and the thermal efficiency is made low so that an operation area to realize the low fuel consumption shown by the chain line shifts to the high engine load side in comparison with the low fuel consumption operation area in FIG. 13(A). Therefore, the usual operation area surrounded by the solid line also shifts to the high engine load side so that by using of the transmission, the engine speed is decreased in order to increase the engine load so as to maintain the engine output.

As the result, if the set engine load LC of the boost pressure control is made the first set engine load LC1 when the first mechanical compression ratio control is carried out, the frequency of operating in about the first set engine load LC1 is increased. Therefore the engine load frequently becomes higher or lower than the first set engine load LC1 and thus the drivability extremely deteriorates because increasing and decreasing the boost pressure is repeated like a step change.

In the present embodiment, according to the second flow chart of FIG. 12, when the second mechanical compression ratio control is carried out at step 204, at step 205, the set engine lead LC for determining if the compressor CP is operated in the first flow chart of FIG. 10 is made a second set engine lead LC2 larger than the first set engine load LC1. Therefore, as shown in FIG. 13(B), the engine load does not frequently become higher or lower than the second set engine load LC2 and thus the deterioration of the drivability caused by the change of the boost pressure can be restrained.

In the present embodiment, the compressor CP arranged in the intake duct 14 is the engine driven-type (supercharger) in which the compressor can connect and disconnect with the engine drive shaft by the electromagnetic clutch. However, the compressor may be an electrically driven-type in which the compressor is driven by an electric motor. In this case, when the engine load becomes the set engine load LC, the electric motor is operated to make the compressor CP in a non-operating state operate and thus the boost pressure can be increased like a step change.

Figure 14:
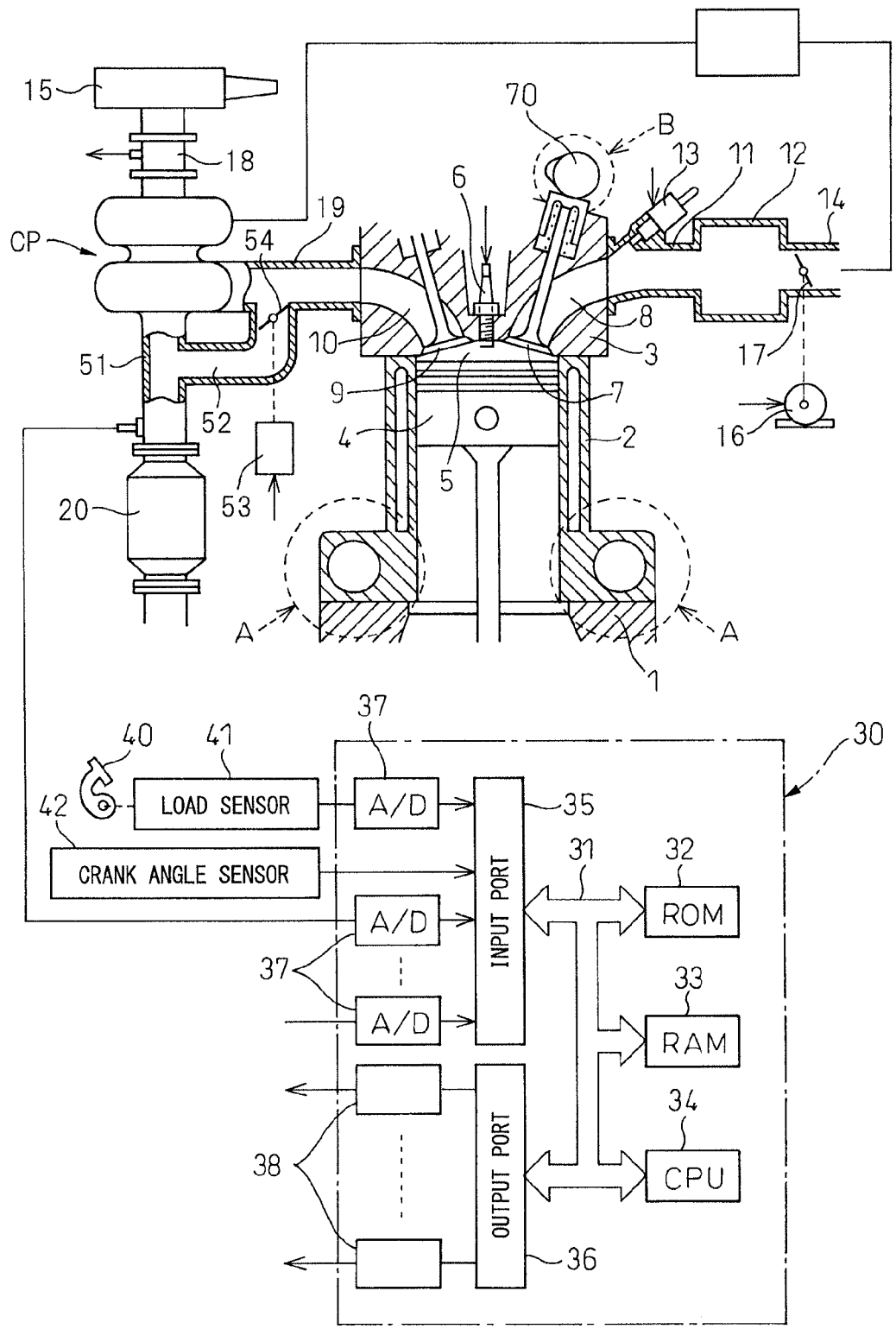
FIG. 14 is an overall view of an internal combustion engine using an exhaust turbocharger.

When the compressor is an exhaust turbocharger CP which utilizes the exhaust pressure, the compressor is connected with a turbine in the engine exhaust system. In this case (see FIG. 14), an exhaust pipe 51, an exhaust bypass passage 52 and an actuator 53 which controls a waste gate valve 54 are provided. When the engine load becomes the set engine load LC, an opening degree of the waste gate valve 54 which is provided in the exhaust bypass passage 52 bypassing the turbine in the engine exhaust system is controlled by the actuator 53, and is rapidly made small to rapidly increase the turbine rotational speed and thus the boost pressure can be increased like a step change by the compressor CP. In this case, when the engine load is lower than the set engine load LC, the turbine rotates at a low speed and thus a boost pressure slightly higher than the atmospheric pressure may be produced by the compressor CP.

When the compressor is a variable nozzle-type turbocharger, the compressor is connected to a turbine with variable nozzles in the engine exhaust system. In this case, when the engine load becomes the set engine load LC, an angle of the variable nozzles is rapidly changed so as to rapidly increase the turbine rotational speed and thus the boost pressure can be increased like a step change by the compressor CP. In this case, when the engine load is lower than the set engine load LC, the turbine rotates at a low speed and thus a boost pressure slightly higher than the atmospheric pressure may be produced by the compressor CP.

LIST OF REFERENCE NUMERALS

A: variable compression ratio mechanism
CP: compressor
30: electronic control unit

The invention claimed is:

1. A spark ignition internal combustion engine, comprising:
a variable compression ratio mechanism configured to change a mechanical compression ratio;
a supercharger; and
an ECU configured to control the variable compression ratio mechanism and the supercharger,
wherein the ECU is configured to carry out a first mechanical compression ratio control and a second mechanical compression ratio control related to the mechanical compression ratio, and boost pressure control to control the boost pressure of the supercharger;
wherein in said first mechanical compression ratio control, the mechanical compression ratio in a low engine load side operation area is higher than that in a high engine load side operation area to increase an expansion ratio;
wherein in said second mechanical compression ratio control, the expansion ratio in the low engine load side operation area is lower than that in the low engine load side operation in said first mechanical compression ratio control;
wherein in the boost pressure control, the boost pressure experiences a step increase when the engine load becomes a set engine load, and
wherein the ECU is configured to set said set engine load of said boost pressure control higher when said second mechanical compression ratio control is carried out than when said first mechanical compression ratio control is carried out.

2. A spark ignition internal combustion engine according to claim 1, wherein the supercharger is an engine driven or electrically driven supercharger; and wherein when the engine load becomes said set engine load or higher, the ECU, in said boost pressure control, makes the engine driven or electrically driven supercharger in a non-operating state operate to make the boost pressure experience the step increase.

3. A spark ignition internal combustion engine according to claim 1, wherein the ECU carries out the first mechanical compression ratio control when a temperature of a catalytic device is equal to or more an active temperature, and the second mechanical compression ratio control when the temperature of the catalytic device is less than the active temperature.

* * * * *